Patented June 10, 1930

1,763,366

UNITED STATES PATENT OFFICE

THOMAS F. NOONAN, OF CHICAGO, ILLINOIS

CEMENTING COMPOSITION

No Drawing.  Application filed November 16, 1925. Serial No. 69,370.

This invention has reference to a cementing composition to be used on metal surfaces for the purpose of stopping up small leaks therein.

Heretofore, it has been the practice to repair leaky gas meters, automobile radiators, and other metal containers under low internal pressure by applying solder externally. This method requires considerable equipment and the services of skilled workmen. In out of the way places, even a skilled workman cannot do the work satisfactorily. Gas companies, in particular, have found that this method of repairing meters in the consumer's house is unsatisfactory and very costly.

The primary object of the present invention is to provide an inexpensive and efficient cement which can be applied readily to metal surfaces, which adheres tightly, which hardens rapidly when exposed to air, and which will not loosen, chip or crack under ordinary service conditions.

Another object is to provide an improved metal cement which can be used in place of solder and is not affected by the constituents ordinarily found in city gas.

I have discovered that the above objects may be accomplished and the disadvantages of former practice overcome by the use of a cementing paste consisting essentially of a powdered base or body material incorporated in a lacquer consisting primarily of a resinous substance which acts as a binder and a volatile solvent or carrier for the binder. For this purpose, I prefer to employ an inorganic substance such as red lead as the base of the cement and ordinary "wet shellac" as the lacquer.

The following ingredients in the following proportions, by weight, have been found to give a paste having proper consistency and the desired hardening and adhesive properties: powdered red lead (substantially pure) 74 per cent., lamp black 4 per cent., dry shellac 7 per cent., wood alcohol 15 per cent.

In preparing the composition, the dry shellac is first mixed with the wood alcohol to form a homogeneous viscous liquid which is known in the trade as "wet shellac". The red lead powder and lamp black are mixed together as in a ball mill and the wet shellac is then stirred in and thoroughly incorporated with the base. The stiff paste thus formed is preferably kept in a closed container until it is to be used.

Before applying the cement to a metal surface, the latter is washed with alcohol or the like to remove any grease. The paste is then spread on the metal so as to cover up the leaks and allowed to set.

Obviously other ingredients having properties generally similar to the materials mentioned in the formula may be used. One reason for using shellac as the binding ingredient is that the hydrocarbons normally present in city gas do not dissolve it. Other solvents for shellac might be substituted for alcohol in the above formula. The lamp black is intended merely as a coloring agent.

In the composition thus provided, the shellac, being uniformly distributed among the red lead particles, serves to cement them firmly together and to the metal surface upon evaporation of the alcohol. Alcohol is employed primarily as the carrier for the shellac during its mixing, but it also facilitates setting of the cement owing to its high volatility. The hard coating formed upon setting of the paste will adhere tightly to the metal surface and will effectually seal any small leaks therein. Service tests on household gas meters and automobile radiators show that the coating is very permanent and will not crack or loosen under ordinary conditions.

The fact that the cement is capable of being applied without the exercise of special skill renders it possible for an inspector upon discovering a leak in a gas meter, for example, to effect a permanent repair. This eliminates the necessity of making temporary repairs pending a subsequent visit by a skilled workman to make the repair permanent by means of solder as has heretofore been the case.

While I have described my invention with considerable particularity for purposes of illustration, it is to be understood that various changes in the ingredients and their proportions may be made within reasonable limits without departing from the spirit and scope of the invention as expressed in the appended claims.

I claim as my invention:

1. A cementing composition consisting essentially of the following ingredients in approximately the following proportions by weight: red lead 74 per cent., lamp black 4 per cent., dry shellac 7 per cent., wood alcohol 15 per cent.

2. A metal cement consisting of a base comprising red lead, a resinous binder and a volatile solvent for said binder, the proportions by weight of the solid and liquid ingredients being approximately in the ratio of 6 to 1 so as to form a stiff non-flowing paste.

3. A cementing composition consisting essentially of the following ingredients in approximately the following proportions by weight: a base consisting of a colored oxide of lead 78 per cent., dry shellac 7 per cent., alcohol 15 per cent.

4. A cementing composition consisting essentially of the following ingredients in approximately the following proportions by weight: a base consisting mainly of an oxide of lead 78 per cent., a resinous binder 7 per cent., a volatile solvent for the binder 15 per cent.

5. A cementing composition consisting essentially of the following ingredients in approximately the following proportions by weight: a base consisting mainly of red lead approximately 78 per cent., a binding lacquer the remainder.

In testimony whereof, I have hereunto affixed my signature.

THOMAS F. NOONAN.